United States Patent
Sigwanz et al.

(10) Patent No.: US 11,297,451 B2
(45) Date of Patent: Apr. 5, 2022

(54) PAIRING INFORMATION FOR WIRELESS COMMUNICATION

(71) Applicant: Sonova AG

(72) Inventors: Ullrich Sigwanz, Hombrechtikon (CH); Nanda Sandhu, Zürich (CH); Daniel Lucas-Hirtz, Rapperswil (CH)

(73) Assignee: SONOVA AG, Stäfa (CH)

( * ) Notice: Subject to any disclaimer, the term of this patent is extended or adjusted under 35 U.S.C. 154(b) by 132 days.

(21) Appl. No.: 16/647,533

(22) PCT Filed: Sep. 18, 2017

(86) PCT No.: PCT/EP2017/073475
§ 371 (c)(1),
(2) Date: Mar. 16, 2020

(87) PCT Pub. No.: WO2019/052668
PCT Pub. Date: Mar. 21, 2019

(65) Prior Publication Data
US 2020/0221239 A1    Jul. 9, 2020

(51) Int. Cl.
*H04R 25/00* (2006.01)
*H04W 4/70* (2018.01)
*H04W 4/80* (2018.01)

(52) U.S. Cl.
CPC .......... *H04R 25/70* (2013.01); *H04R 25/554* (2013.01); *H04W 4/70* (2018.02); *H04W 4/80* (2018.02); *H04R 2225/55* (2013.01)

(58) Field of Classification Search
CPC .................................................. H04W 4/80
See application file for complete search history.

(56) References Cited

U.S. PATENT DOCUMENTS

| | | | |
|---|---|---|---|
| 8,358,794 B2 | 1/2013 | Schulz | |
| 10,657,242 B1* | 5/2020 | Xia | G06F 21/35 |
| 2010/0305421 A1* | 12/2010 | Ow-Wing | G16H 40/63 |
| | | | 600/365 |
| 2011/0223862 A1* | 9/2011 | Satoh | G08C 17/00 |
| | | | 455/41.2 |
| 2013/0171938 A1* | 7/2013 | Mears | G16H 40/67 |
| | | | 455/41.2 |
| 2014/0256262 A1* | 9/2014 | Park | H04L 63/0407 |
| | | | 455/41.2 |

(Continued)

FOREIGN PATENT DOCUMENTS

EP    1 701 585 B1    6/2012

OTHER PUBLICATIONS

European Patent Office, International Searching Authority, International Search Report for PCT/EP2017/073475, dated Mar. 21, 2019, Rijswijk, Netherlands.

*Primary Examiner* — Wen W Huang
(74) *Attorney, Agent, or Firm* — Pearne & Gordon LLP

(57) ABSTRACT

The disclosed technology includes a system and method for providing pairing information to assist in pairing devices for wireless communication. For example, the disclosed technology includes a method for visually displaying time remaining in pairing time windows for hearing aid devices. A hearing aid professional can view the displayed information on a computer, fitting station, or mobile device and then use this information to determine which devices can be paired or how much time is remaining to pair the device.

20 Claims, 4 Drawing Sheets

(56) References Cited

U.S. PATENT DOCUMENTS

| | | |
|---|---|---|
| 2015/0085682 A1* | 3/2015 | Hasegawa ......... H04M 1/72412 |
| | | 370/252 |
| 2016/0104194 A1 | 4/2016 | Jang |
| 2016/0118044 A1* | 4/2016 | Bondarev ............. G06F 16/685 |
| | | 704/235 |
| 2016/0125733 A1 | 5/2016 | Sallas |
| 2017/0353979 A1* | 12/2017 | Lee ....................... H04W 88/04 |
| 2018/0367944 A1* | 12/2018 | Heo ...................... H04W 12/50 |
| 2019/0052714 A1* | 2/2019 | Shin ..................... H04W 12/06 |
| 2020/0374954 A1* | 11/2020 | Chen .................... H04B 5/0031 |

\* cited by examiner

PAIRING INFORMATION FOR WIRELESS COMMUNICATION

TECHNICAL FIELD

The disclosed technology includes a method for providing pairing information for wireless communication. More specifically, the disclosed technology includes visually displaying or acoustically providing an amount of time remaining in a pairing time window for a hearing device that is attempting to establish a wireless communication link with another device.

BACKGROUND

For devices to communicate wirelessly, a pairing operation is often required. For example, a smart phone can wirelessly communicate with a computer after completing a Bluetooth™ pairing operation or a hearing device can wirelessly communicate with a mobile phone after completing a Bluetooth™ pairing operation. A device user can initiate the Bluetooth™ pairing manually.

During the pairing process, a device broadcasts its availability for pairing to other devices. Other devices in the vicinity (e.g., 10 meters) receive broadcasting packets and can wirelessly connect with the broadcasting device. In some implementations, a pairing process is completed with a passkey, which is a code that each device agrees on to complete the pairing process. In other implementations, a passkey is not necessary and the devices simply connect after a user of one device accepts the invitation to have a wireless connection with another device.

To unburden a user from constantly monitoring and controlling pairable states, devices usually have a limited duration where pairing is possible referred to as "the pairing time window." The pairing time window is the duration of the state during which the device is available for pairing with another device to establish a wireless communication link. The pairing time window can be short (e.g., less than 30 seconds), long (e.g., 3 or more minutes), or indefinite (e.g., as long as a device is on). The duration of a pairing time window depends on the design specifications and designer preferences. For example, a hearing aid can have a 3 minute pairing time window and a mobile device can have a 1 minute pairing time window.

Pairing can be problematic. For example, if a user is attempting to pair several devices, a user can struggle to determine which devices recently started a pairing time window and have a lot of time remaining compared to the devices that have little or no time remaining in a pairing time window. Additionally, if a user attempts to pair device that has a pairing time window that is about to expire, it can be frustrating for the user to attempt to pair the device only to determine the device is no longer available for pairing. Accordingly, a need exits to address these short comings and improve pairing operations.

BRIEF DESCRIPTION OF THE DRAWINGS

The disclosure and accompanying figures describe some implementations of the disclosed technology.

Figure 1:
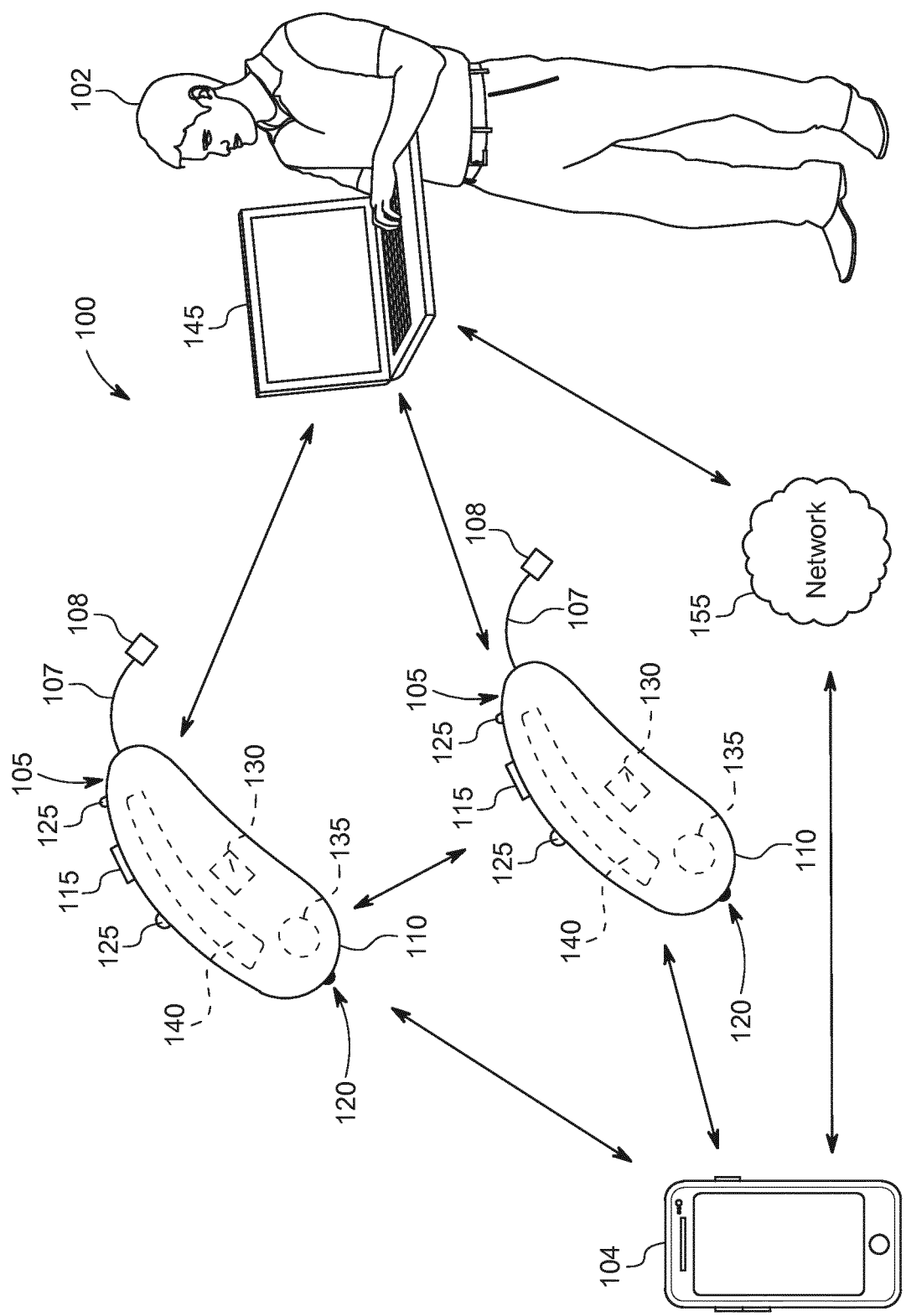
FIG. 1 illustrates a pairing environment with hearing devices, a mobile device, a user station, and a network in accordance with some implementations of the disclosed technology.

The drawings are not drawn to scale and have various viewpoints and perspectives. Additionally, some components and/or operations of the drawings may be separated into different blocks or combined into a single block for the purposes of discussion of some of the implementations of the disclosed technology. While the disclosed technology is amenable to various modifications and alternative forms, specific implementations have been shown by way of example in the drawings and are described in detail below. The disclosed technology is intended to cover modifications, equivalents, and alternatives falling within the scope of the disclosed technology as defined by the appended claims.

DETAILED DESCRIPTION

Pairing is a complex problem in the hearing aid industry. Hearing aids are small devices and have simple interfaces (also referred to as "user interface poor" devices). A user cannot look at a hearing aid to determine whether it is pairable or whether it has initiated a pairing sequence. Also, hearing aids have a limited number of user inputs and controls to determine anything about the pairing process. Pairing problems are exacerbated with hearing aids and Bluetooth™ technology. For example, with Bluetooth™ Low Energy for hearing devices, the limited user interface of a hearing aid and lack of readily available pairing information cause a hearing care professional (HCP) to experience problems when the HCP is attempting to assign a wireless hearing aid to a patient.

In particular to the, HCP struggle with a "designation" problem when pairing hearing aids. When an HCP tries to assign a pair of hearing aids to a patient in a fitting application (e.g., using a personal computer running fitting software), the fitting application may not only display the two hearing aids that the HCP has just turned on, but it may also display several other hearing aids available for pairing. For example, because several HCPs work in an audiology clinic in close proximity, or because a patient happens to turn on his or her pair of hearing aids in the waiting room, the HCP will need to distinguish which devices he or she wants to pairing for the fitting application even though the HCP see several hearing aids on a list available for pairing in the fitting application. For example, the HCP may not be able to distinguish between hearing aids in his or her hands versus other hearing aids in the room for pairing purposes. know if the pair of hearing devices which he or she is holding in her hands.

Another technical problem is the elapsing of the pairing time window duration. Assigning a hearing aid to a patient in a fitting application is a lengthy process. During this process, the HCP will assign a side (left or right ear) to each hearing device, he or she may check whether the hearing device represented on the fitting application matches with the one in his or her hand by either choosing the "play beep" option, or by pressing a button on the hearing, or by checking the serial number. Investing time in this process, and then realizing the pairing time window has elapsed, is frustrating for the HCP.

Also, another problem with pairing hearing aid devices is that wireless communication protocols currently lack the hardware and software to transmit pairing time window information before, after, or during the pairing process.

In contrast to hearing aids that lack a method for providing pairing time window information, the disclosed technology includes a system and method for providing pairing information such as time remaining in a pairing time window to assist in pairing operations. For example, the disclosed technology includes a method for visually displaying on a graphical user interface (GUI) time remaining in pairing time windows for hearing aids. The disclosed technology includes a hearing aid that transmits the time remaining in its pairing time window and a hearing aid station that can visually display this information. In some implementations, the HCP views the remaining pairing time window information on a computer, fitting station, or mobile device and then uses this information to determine which hearing aids can be paired or how much time is remaining to pair the hearing devices. As such, the hearing aid can be referred to as the "poor user interface" device because it only has a user input button and the computer or mobile device can be referred to as the "user interface rich device" because it has a graphical user interface or keyword, which allows for easier user input.

The pairing information can be provided in variety of ways through a GUI. In some implementations, pairing time window information is provided with a decreasing or increasing pairing duration counter (e.g., a digital or analog clock), a graphical representation such as a graph (e.g., bar graph) of the remaining pairing duration, a percentage of time remaining, or a list sorted by remaining pairing duration the detected pairable devices.

In some implementations, the disclosed technology has at least one benefit. For example, the disclosed technology enables users to determine which devices recently activated a pairing process compared to devices that activated the pairing process a long time ago. This can enable a HCP to distinguish which hearing device he or she wants to choose for a pairing process and to decide whether the remaining duration is sufficient to start an assignment process (e.g., selecting a hearing aid to be a left or right hearing device). In comparison with methods that determine the remaining time in a pairing time window based on the duration of a first received broadcast, the disclosed technology can provide the remaining time for pairing based on internal states of a device provided explicitly in a packet (e.g., a pairing packet includes amount of time remaining in pairing time window).

Additionally, the disclosed technology can provide some indication as to the remaining amount of time during which hearing devices remain available for pairing helps the HCP to either initiate this process if he or she judges he or she has enough time or to reset the pairing time window duration by performing the pairing gesture on the hearing device if she judges otherwise. pairing time window pairing time window. For example, the disclosed technology assists a user in distinguishing which wireless communication devices are designated with a "turn on" gesture, e.g., when more than two devices are shown as pairable, the two devices that have a very similar time remaining in pairing time window are probable the two which have been turned on together. In some implementations, the HCP will know when the remaining pairing time window is about to expire, and he or she will not lose his or her selections and options that he or she made in the selection and designation steps (e.g., type of device, left or right, etc.).

Table 1 has some definitions of terminology that apply to this disclosed technology.

TABLE 1

Terminology

| Term | Definition |
| --- | --- |
| Wireless communication device | is an electric device configured to wirelessly communicate. |
| A hearing device | is a device that provides audio to a user; some example hearing devices include a hearing aid, headphones, earphones, assisted listening devices, or any combination thereof; and hearing devices also include both prescription devices and non-prescription devices configured to be worn on a human head. |
| A hearing device component | is a component coupled to a hearing device; some example hearing device components include cerumen protection, battery door, or sound tube. |
| A heading aid | is a device that provides amplification or attenuation (e.g., a hearing aid to compensate for hearing loss or attenuation functionalities) to a signal; some example hearing aids include a behind-the-ear (BTE), receiver-the-ear (RIC), in-the-ear (ITE), completely in the canal (CIC), or invisible in the canal (IIC) hearing aid. |
| Pairing time window | A time period for pairing a device for wireless communication. |

FIG. 1 illustrates an example of a pairing environment 100. The pairing environment 100 includes hearing devices 105, a mobile device 104, a user station 145, and a user 102. Although two hearing devices 105, one mobile device 104, one user station 145, and one user 102 are shown in FIG. 1, the pairing environment 100 can include a single hearing device 105, multiple mobile devices, or multiple users.

The hearing devices 105 include a housing 110, sound channel 107, receiver 108 (e.g., a transducer, speaker, audio output device), user input 115 (also referred to as a "user control") for the hearing devices 105, battery door 120, sound entrances 125 (e.g., a sound entrance enables sound to travel to a microphone located on the interior of the hearing device), processor 130, battery 135 (e.g., rechargeable battery or lithium ion battery), and an antenna 140. FIG. 1 shows processor 130, the battery 135, and the antenna 140 with dashed lines to indicate that these hearing device components are partially or completely inside the housing 110. Also, although not shown in FIG. 1, the hearing device 105 can include a microphone or two microphones on the interior (or exterior) of the hearing device to receive and process sound. The hearing devices 105 can also communicate with each other (e.g., binaural communication or over another wireless link).

The hearing device 105 can receive input from the user input 115. For example, a user can push the user input 115 to signal pairing (e.g., Bluetooth Pairing™) the hearing device 105 with another device such as the user station 145. In some implementations, a user can also use the battery door 120 as user input, e.g., to pair the hearing device 105 with another device or trigger communication between the hearing device and another device. For example, a user can open and close the battery door 120 a single time or multiple times to send an input signal to the hearing device 105.

The processor 130 controls and processes information for the hearing device 105. The processor 130 can include special-purpose hardware such as application specific integration circuits (ASICS), programmable logic devices (PLDs), field-programmable gate arrays (FPGAs), programmable circuitry (e.g., one or more microprocessors microcontrollers) appropriately programmed with software and/or firmware, or a combination of special purpose hardware and programmable circuitry. In some implementations, the processor 130 is physically and electronically coupled to memory such as volatile memory, nonvolatile memory and dynamic memory. In some implementations, the processor 130 is configured to execute instructions to implement a wireless communication protocol such as Bluetooth™. The processor 130 can be configured to send out packets (e.g., advertising packets) that include time remaining in the pairing time window or send a first packet that indicates it is a first packet and the amount of time in a pairing time window.

The mobile device 104 can be a mobile phone, smart phone, tablet computer, laptop computer, desktop computer, mobile media device, mobile gaming device, virtual or augmented reality headset, vehicle-based computer, wearable computing device, or portable electronic device. In some implementations, the mobile device 104 includes software or a mobile application that controls or communicates with the hearing device 105. In some implementations, the hearing device 105 can communicate with the mobile device 104 using Bluetooth™, Zigbee™, or similar technologies where signals are propagated from the antenna 140 to the mobile device 104.

The user station 145 can include a computing device with a display. Some examples of the user station 145 include a hearing care professional station (e.g., a computer with hearing aid fitting software), a laptop, tablet, computer, or another computing device. In some implementations, the user 102 is a hearing aid professional that is fitting many (e.g., more than two hearing aids) with the user station 145. For example, a hearing care professional can be testing, fitting, or programming 10 different hearing aids that are connected or attempting to connect to the user station 145. In some implementations, the user station 145 can connect to a peripheral devices that assist with wireless communication (e.g., a device to connect a computer with Bluetooth devices).

The network 155 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The network 155 can include communication networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network such as a Wireless Local Area Network (WLAN). In general, the network 155 enables the hearing devices 105 to send and receive information from the Internet via the mobile device 104. For example, the network 155 can be a Wi-Fi™ network or a networking implementing a IEEE 802.11 standard.

Figure 2:
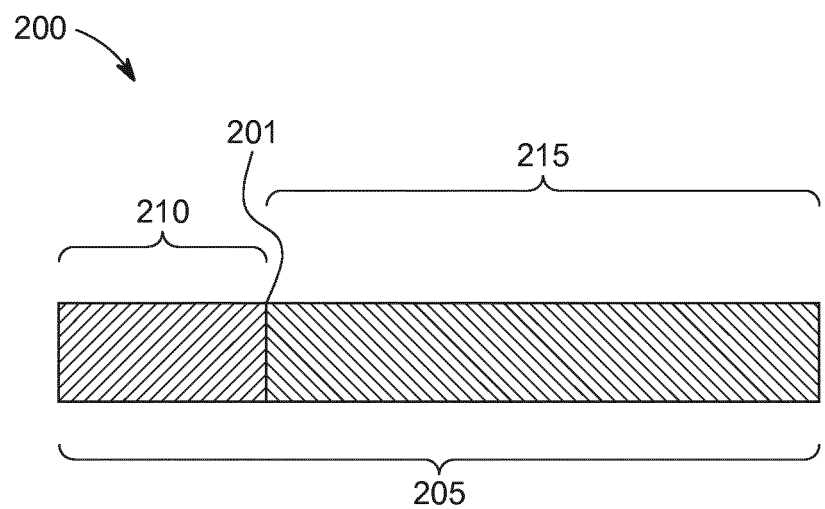
FIG. 2 illustrates pairing time window information in accordance with some implementations of the disclosed technology.

FIG. 2 illustrates pairing time window information 200. The pairing time window information can include the pairing time window 205, which is the total amount of time in a pairing time window; the pairing time window time that has elapsed 210; the current time in pairing time window 201; and the time remaining in the pairing time window 215. In some implementations, it is preferred to send only the time remaining in the pairing time window because it requires a device to transmit less information. Although a device can compute the amount of time remaining in a pairing time window based on the total pairing time window time 205 or the amount of pairing time remaining, it is simple for a device to just receive the time rather than compute it.

Figure 3:
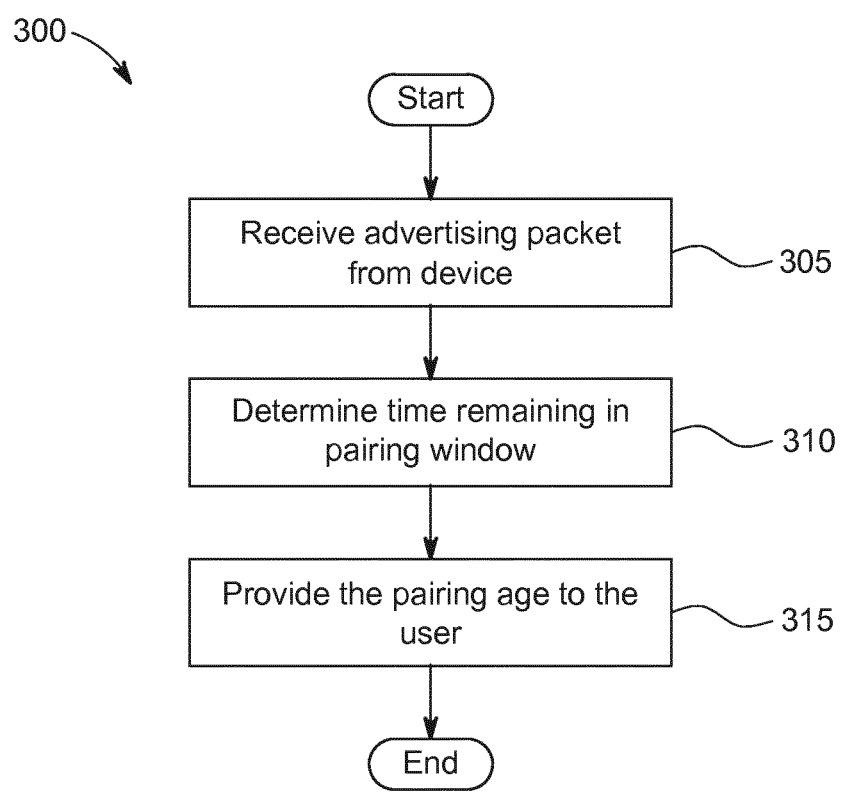
FIG. 3 illustrates a block flow diagram for providing pairing information for wireless communication devices in accordance with some implementations of the disclosed technology.

FIG. 3 illustrates a block flow diagram for a process 200 for providing pairing information. The process 200 can be initiated by a user of a user station or a user with a wireless communication device such as a hearing device. For example, a HCP can turn off and on 10 different hearing devices located in a room and then begin pairing these devices with a hearing aid professional station. Alternatively, a wireless communication device can automatically initiate the process 200 by broadcasting its desire to pair with another device.

At operation 305, a wireless communication device receives an advertising packet with pairing information from a wireless communication device. For example, the wireless communication can receive a packet from a Bluetooth™ enabled device such as a hearing aid, where the packet includes the time remaining the pairing time window for the device (e.g., 120 seconds). The receiving devices can be a user station (e.g., FIG. 1). In some implementations, the wireless communication device can transmit the time that has elapsed in its pairing time window, the time remaining in its pairing time window, the total time in its pairing time window, the percentage of the time remaining in its pairing time window, or any combination of these (e.g., percentage of time remaining and actual time remaining in pairing time window, elapsed time and total time in window). The receiving device of the wireless communication can use this information to calculate the time remaining in a device's pairing time window.

At operation 310, the wireless communication device determines time remaining in the pairing time window. The wireless communication device can determine pairing information based receiving a pairing packet that includes time remaining in pairing time window. For example, a computer can receive an advertising packet from a wireless communication device that is attempting to pair with the computer, and the advertising packet can include information that the wireless communication device has 3 minutes remaining in its pairing time window (i.e., time remaining in pairing time window). In some implementations, the receiving device can update the amount of time remaining in pairing based on packets received later with updated time remaining information. Alternatively, the wireless communication can determine pairing information by estimating the pairing information based on the first received advertising packet (e.g., a particular hearing aid always has 3 minutes in its pairing time window, so once a first packet is received, a 3 minute clock starts).

At operation 315, the wireless communication device provides the pairing time window information to a user. In some implementations, wireless communication device provides the pairing time window information by displaying a bar graph of the time remaining on a computer screen, mobile device screen, or user station. For example, wireless communication device can receive a packet at the operation 305 that indicates the device has 100 seconds left, and a computing device can display a bar graph with a full bar (see FIGS. 4A and 4B for example) and the show that the bar decreases as time moves on until the pairing time window has expired. When a pairing time window has expired, the wireless communication device can remove the provided information (e.g., removing the bar from the list, deleting the pair, or changing the color of the text or display). In some implementations, the wireless communication device provides the remaining pairing time window information as a percentage of time left (e.g., 100% means full time left and 0% means no time left) or as a counter with seconds and/or minutes. After operation 315, the process 200 can stop, be repeated, or updated. In some implementations, the wireless communication device continues to receive packets that indicate how much time is left in a pairing time window and the wireless communication device can use this information to modify or update the provided information.

In addition to or alternative to providing a visual indication of the time remaining in a pairing time window, the wireless communication device can acoustically provide the pairing time window information. For example, a user station can transmit an audio sound wave from its speakers where the audio sound wave states the amount of time remaining in a pairing time window for a particular hearing aid selected by the user, all hearing aids appearing on the list, or only those hearing devices that have less than 50% of time remaining in their respective pairing time windows.

In addition to providing pairing information, the process 200 can also order or arrange the display of pairing information based on pairing information for each wireless device. For example, the process 200 can determine the time remaining for several different devices remaining in a pairing time window and then order or sort these devices from based on shortest time and longest time (e.g., 10 seconds to 3 minutes). The process 300 can then provide this information to a computing device that displays the devices with shortest or longest remaining pairing times first or last. Table 2 below provides an example, where rank is the 1-6 with 1 being the most amount of time remaining and 6 being the least amount of time remaining. As can be inferred from the pairing time remaining and rank, a user can determine if devices are related (e.g., attempted to pair at the same time) or if one device more recently attempted to pair compared to another device.

TABLE 2

| Device | Remaining time in Pairing time window | Rank |
| --- | --- | --- |
| Hearing Device 1 | 3 minutes | 1 |
| Hearing Device 2 | 2 minutes 45 seconds | 2 |
| Hearing Device 3 | 2 minutes 44 seconds | 3 |
| Hearing Device 4 | 1 minute 55 seconds | 4 |
| Hearing Device 5 | 1 minute 54 seconds | 5 |
| Hearing Device 6 | 10 seconds | 6 |

FIGS. 3A and 3B illustrate example graphical user interfaces for displaying pairing time window information in accordance with some implementations of the disclosed technology. The mobile device or user station (FIG. 1) can display and update the graphical user interfaces 300a and 300b.

GUI 400a includes information related to pairing. On the left side of the GUI 400a is a list of hearing devices 105. The GUI 400a can include information about each hearing device such as the type, audio maker, or other information that is received or communicated via a wireless communication link. The GUI 400a can include information about the pairing age of a hearing device, pairing age generally refers to time remaining in the pairing time window. The pairing age bar graphs 410a, 410b, 410c, and 410d show that hearing devices 105 having a small amount of time left (less than 10% of the bar, e.g., hearing aid 1) whereas the hearing device 105 has more time left in its pairing time window (e.g., more than 80%, hearing aid 4). In some implementations, the bar graphs 410a-d can change colors to indicate time remaining in the pairing time window. For example, the bar graph can be green when more than 70% of the pairing time window remains, yellow when more than 30% of the pairing time window remains, and red when 10% or more of the pairing time window remains.

Figure 4A:
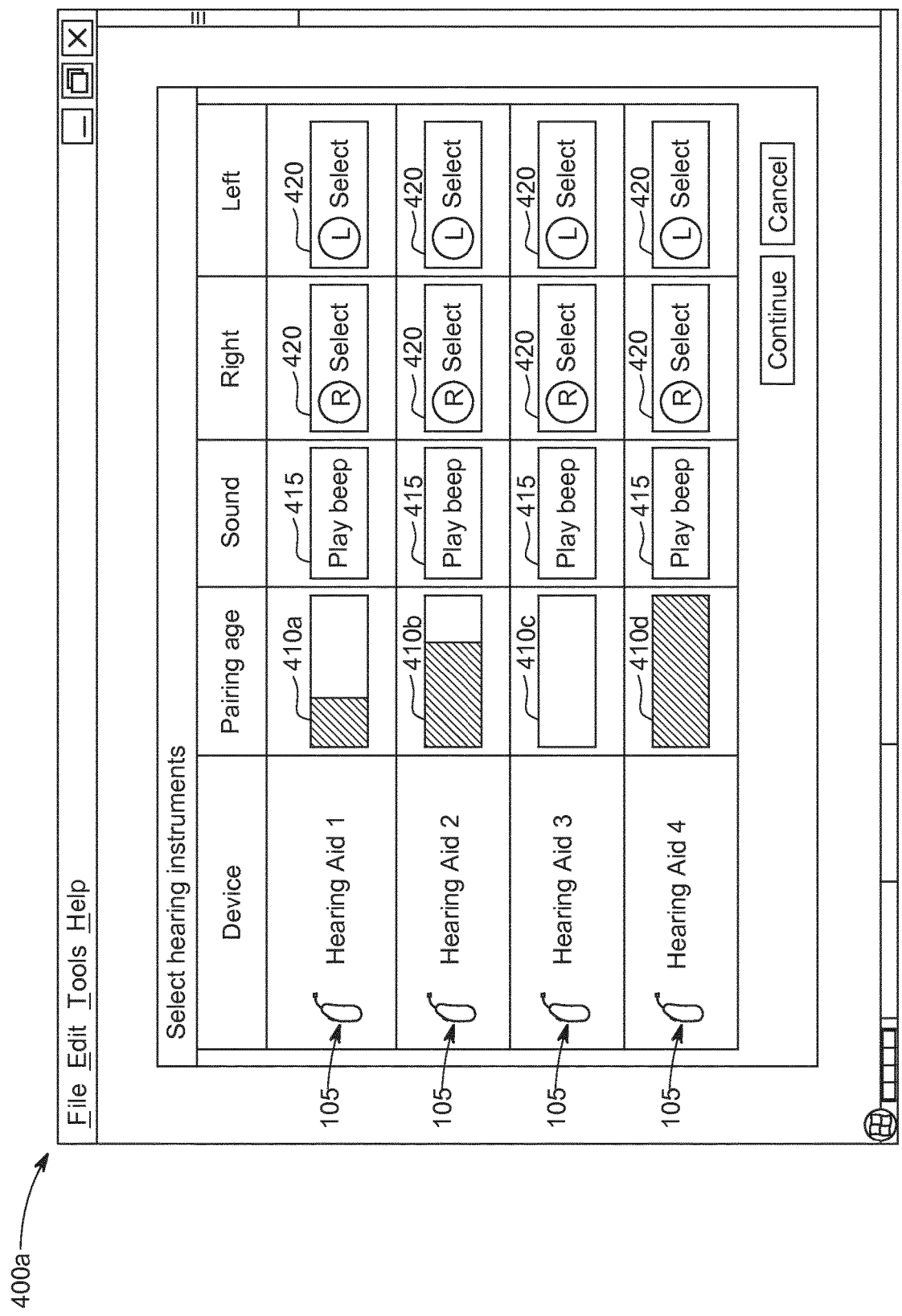
FIGS. 4A and 4B illustrate example graphical user interfaces for displaying pairing time window information in accordance with some implementations of the disclosed technology.
Figure 4B:
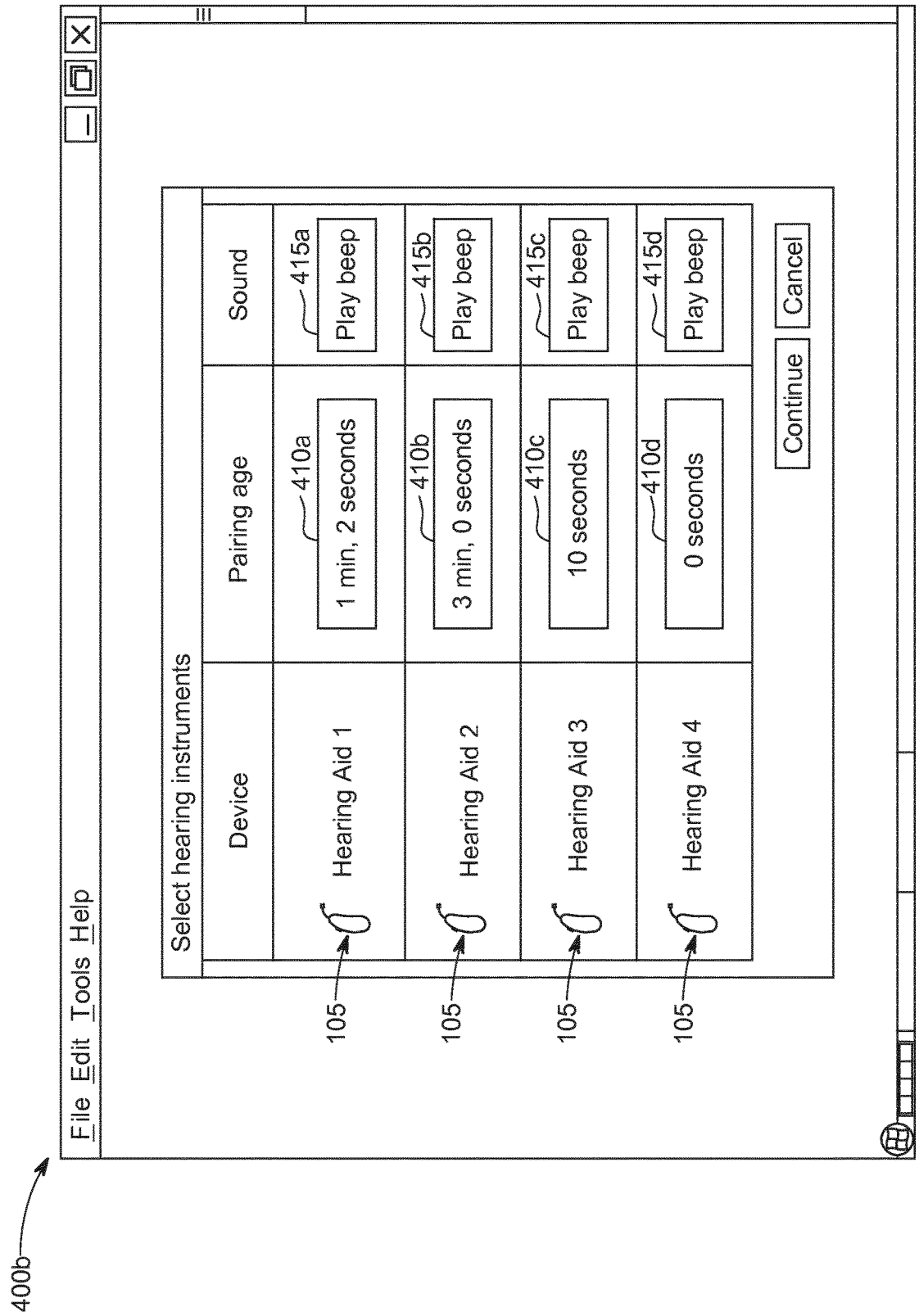

The GUI 400a also includes buttons 415, which a user can toggle or push to cause a hearing device to play a sound. The GUI 400a also includes buttons 420, which a user can toggle or push to cause a hearing device to be selected as a right or left hearing aid. In some implementations, the user can push or toggle button 420 can the hearing device 105 associated with that button will output an sound that states how much time is remaining the pairing time window, what percentage of the pairing time window is remaining, or the pairing time window total time. Although four hearing aid devices are shown in the GUI 400a, the GUI 400a can include more devices (e.g., 10, 20, or more). In some implementations, hearing devices shown in FIG. 4A are hearing devices 105 (FIG. 1). In some implementations, the GUI 400a can also show devices other than hearing aids attempting to establish a wireless link (e.g., Bluetooth™) such as mobile phones, computers, or other wireless communication devices.

In some implementations, a hearing device shown on the GUI 400a can change color. For example, if a pairing time window is about to expire (e.g., within 10 seconds) the row for that hearing device can change to red, grey, or be highlighted or flash. The change in color can indicate the time remaining in the pairing time window is limited. Also, the GUI 400a can highlight a hearing device in a particular row with grey or yellow highlight if a user selects or identifies that device (e.g., by pushing a user control on the device).

Similar to GUI 400b, the GUI 400b includes information related to pairing. However, the GUI 400b displays a time counter with minutes and seconds, which can assist a user in pairing wireless communication devices such as hearing aids. On the left side of the GUI 400b is a list of hearing devices 105. The GUI 400b can include information about each hearing device such as the type, audio maker, or other information that is received or communicated via a wireless communication channel. The GUI 400b also includes buttons 410a, 410b, 410c, and 410b, which a user can toggle or push to cause a hearing device to play a sound. Although four hearing aid devices are shown in the GUI 400b, the GUI 400b can include more devices (e.g., 10, 20, or more). In some implementations, a hearing device shown on the GUI 400b can change color. For example, if a pairing time window is about to expire (e.g., within 10 seconds) the row for that hearing device can chance to red, grey, or be highlighted. The change in color can indicate the time remaining in the pairing time window is limited.

Although the GUIs 400a and 400b show time in as a bar graph or time counter, a screen can display the pairing time window in another way. For example, the GUIs 400a and 400b can display the time as a circle that is full, partially full, or empty; as a rotating analog clock or timer; as different colors (e.g., red indicates no time, yellow some time, and green maximum or near maximum time); as different shapes (e.g., squares mean no time, triangle means some time, and circles means maximum or near maximum time); or any combination. In some implementations, a user can push a user control device on the wireless communication device and the selected hearing device can be highlighted (e.g., with a change in color or text) to indicate that the user selected that particular wireless communication device.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the technology provided herein can be applied to other systems, not necessarily the system described above. For example, although several examples include hearing aids or hearing devices, the disclosed technology can be used with mobile phones, internet-of-thing (IoT) devices (e.g., sensors, appliances, smart watches, smart speakers, and other IoT devices), and computing devices. Although Bluetooth™ communication examples are provided above, other wireless communication standards that use pairing can be used such as Bluetooth Low Energy™, Bluetooth 4.0™, Bluetooth 5™, Bluetooth Mesh™ ZigBee™ or Z-Wave™.

Although the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

The techniques introduced here can be implemented as special-purpose hardware (e.g., circuitry), as programmable circuitry appropriately programmed with software or firmware, or as a combination of special-purpose and programmable circuitry. Hence, implementations can include a machine-readable medium storing instructions that can be used to program a computer (or other electronic devices) to perform a process. The machine-readable medium may include, but is not limited to, optical disks, compact disc read-only memories (CD-ROMs), magneto-optical disks, Read Only Memories (ROMs), random access memories (RAMs), erasable programmable read-only memories (EPROMs), electrically erasable programmable read-only memories (EEPROMs), magnetic or optical cards, flash memory, or other type of media suitable for storing electronic instructions. The machine-readable medium includes non-transitory medium, where non-transitory excludes propagation signals. For example, a processor can be connected to a non-transitory computer-readable medium (CRM) that stores instructions for executing instructions by the processor. For example, the processor 130 (FIG. 1) can have access to or include memory storing instructions.

Example Implementations

The following example implementations for the disclosed technology. One example is a method for providing pairing information, the method comprising: receiving pairing information for a wireless communication device, wherein the pairing information includes time remaining in a pairing time window for the wireless communication device; providing an indication of the time remaining in the pairing time window via a graphical user interface or acoustical output. The method can include a graphical user interface that is a touchscreen or computer screen that is displaying a visual indication of the time remaining in the pairing time window for the wireless communication device. The method can also include a visual indication that is at least one of following: a time displaying including time remaining in the pairing time window; a bar graph at least partially indicating amount of time left in the first or second pairing time window; a percentage symbol at least partially indicating time remaining in the first or second pairing time window; or any combination thereof.

In some implementations, the disclosed technology includes a method for providing pairing information that includes: receiving first pairing information for a first wireless communication device, wherein the first pairing information includes time remaining in a first pairing time window for the first wireless communication device; receiving second pairing information for a second wireless communication device, wherein the second pairing information includes time remaining in a second pairing time window for the second wireless communication device; and providing a visual indication of the time remaining in the first and second pairing time windows via a graphical user interface.

Additionally, the method can further comprise receiving a push indication from the first or second wireless communication device modifying the visual indication in response to receiving the push indication; or receiving a push indication from the first or second wireless communication device and modifying the visual indication in response to receiving the push indication and playing a sound associated with the received push indication. The first and second wireless communication devices can be configured to communicate using Bluetooth™. The visual indication can include at least one of the following: a counter displaying time remaining in minutes and seconds; a bar graph at least partially indicating amount of time left in the first or second pairing time window; a percentage symbol at least partially indicating time remaining in the first or second pairing time window; or any combination thereof.

Also, in some implementations, the method can include receiving a selection of the first or second wireless communication device via the graphical user interface; modifying the visual indication in response to receiving the selection; and transmitting instructions to the first or second wireless communication device to play a sound associated with the selection. In some implementations, the method includes providing the visual indication in an ordered list, where the list is at least partially based on wireless communication device with the most time remaining in the pairing time window. For example, a hearing aid with 3 minutes remaining in its pairing time window on top of the list and a hearing aid with 20 seconds on the bottom of the list on a GUI for a mobile device or hearing fitting station. In some implementations, the method further comprises: receiving a request to reset the first or second pairing time window; and sending instructions to the first or second wireless communication devices to reset the first or second pairing time window; modifying the visual indication to at least partially include a new pairing information for the first or second device. The method can also include providing an ordered list of time remaining in pairing time windows, where the list has wireless communications devices similar time remaining in pairing time windows next to each other. As part of creating, modifying, or updating the list, the method can further comprise removing the first or second wireless communication device from the graphical user interface in response to determining the first or second pairing time window has expired; or modifying the color of the first or second wireless communication device shown on the graphical user interface in response to determining the first or second pairing time window has expired. In some implementations, the method includes receiving third pairing information for a third wireless communication device, wherein the third pairing information includes time remaining in a third pairing time window for the second wireless communication device, wherein the first, second, and third wireless communication devices are hearing devices.

In some implementations, the disclosed technology is executed using a non-transitory computer-readable medium. A non-transitory computer-readable medium storing instructions that when executed by a processor cause a hearing device to perform operations, the operations comprising: receiving first pairing information for a first wireless communication device, wherein the first pairing information includes time remaining in a first pairing time window for the first wireless communication device; receiving second pairing information for a second wireless communication device, wherein the second pairing information includes time remaining in a second pairing time window for the second wireless communication device; and providing a visual indication of the time remaining in the first and second pairing time windows via a graphical user interface. The non-transitory computer readable can further comprise receiving a push indication from the first or second wireless communication device; and modifying the visual indication in response to receiving the push indication.

The non-transitory computer readable medium can further comprise receiving a push indication from the first or second wireless communication device; modifying the visual indication in response to receiving the push indication; and playing a sound associated with the received push indication. The non-transitory computer readable medium can include instructions for the visual indication is at least one of following: a visual display on time remaining in minutes and seconds; and a bar graph at least partially indicating amount of time left in pairing time window. The non-transitory computer readable medium can further comprise instructions for: providing an ordered list of time remaining in pairing time windows, where the list has the wireless communication device with the most time remaining first and the least time remaining last, wherein the first and second wireless communication devices are configured to communicate using Bluetooth. The non-transitory computer readable medium can further comprise: receiving a request to reset the first or second pairing time window; sending instructions to the first or second wireless communication devices to reset the first or second pairing time window; and modifying the visual indication to at least partially include a new pairing information for the first or second device. The non-transitory computer readable medium can further comprise providing an ordered list of time remaining in pairing time windows, where the list has similar pairing time windows next to each other or sending instructions to user to restart a pairing process for the first or second wireless communication device in response to determining that.

In some implementations, the disclosed technology is executed with a hearing device. The hearing device comprising: a microphone; a speaker; a processor coupled to the microphone and speaker; an antenna configured to transmit and receive wireless communication signals; a memory coupled to the processor, the memory storing instructions that when executed by the processor cause the hearing device to: sending time remaining in a first pairing time window for the hearing device to a computing device, wherein the sending occurs until the pairing time window has expired. The memory can further store instructions for receiving an indication the other computing to play a sound; and providing the sound in response to receiving the indication.

In some implementations, the disclosed technology includes a computer-implemented method for providing pairing information, the method comprising: displaying a first pairing information for a first wireless communication device, wherein the first pairing information includes a first pairing time window age for the first wireless communication device; displaying a second pairing information for a second wireless communication device, wherein the second pairing information includes a second pairing time window age for the second wireless communication device; displaying a visual indication of the time remaining in the first and second pairing time windows via a graphical user interface; and modifying the visual indication after the first or second pairing time window has expired. In some implementations, the computer-implemented further comprising: receiving a push indication from the first or second wireless communication device; and modifying the visual indication in response to receiving the push indication. The computer-implemented method can be performed on a hearing aid fitting station.

What is claimed:

1. A method for providing pairing information, the method comprising:
   receiving pairing information for a first wireless communication device,
   wherein the pairing information includes time remaining in a first pairing time window for the first wireless communication device;
   receiving second pairing information for a second wireless communication device,
   wherein the second pairing information includes time remaining in a second pairing time window for the second wireless communication device; and
   providing an indication of the time remaining in the first and second pairing time windows via a graphical user interface or a speaker.

2. The method of claim 1, wherein the graphical user interface is a touchscreen or computer screen that is displaying a visual indication of the time remaining in the pairing time window for the wireless communication device.

3. The method of claim 1, wherein the indication is at least one of following:
  a time display including time remaining in the first or second pairing time window;
  a bar graph at least partially indicating amount of time left in the first or second pairing time window;
  a percentage symbol at least partially indicating time remaining in the first or second pairing time window; or any combination thereof.

4. A method for providing pairing information, the method comprising:
  receiving first pairing information for a first wireless communication device,
    wherein the first pairing information includes time remaining in a first pairing time window for the first wireless communication device;
  receiving second pairing information for a second wireless communication device,
    wherein the second pairing information includes time remaining in a second pairing time window for the second wireless communication device; and
  providing a visual indication of the time remaining in the first and second pairing time windows via a graphical user interface.

5. The method of claim 4, further comprising:
  receiving an input indication from the first or second wireless communication device;
  and modifying the visual indication in response to receiving the input indication.

6. The method of claim 4, further comprising:
  receiving a selection of the first or second wireless communication device via the graphical user interface;
  modifying the visual indication in response to receiving the selection; and
  transmitting instructions to the first or second wireless communication device to play a sound associated with the selection.

7. The method of claim 4; wherein the first and second wireless communications devices lack a graphical user interface, and wherein a mobile device provides the visual indication, wherein the visual indication is at least one of following:
  a representation of time remaining in a digital or analog display;
  a bar graph at least partially indicating amount of time left in the first or second pairing time window;
  a percentage symbol at least partially indicating time remaining in the first or second pairing time window; or any combination thereof.

8. The method of claim 4, further comprising:
  providing the visual indication in an ordered list, where the list is at least partially based on the first or second wireless communication device with the most time remaining in the first or second pairing time window.

9. The method of claim 4, wherein the first and second wireless communication devices are configured to communicate using Bluetooth.

10. The method of claim 4, further comprising:
  receiving a request to reset the first or second pairing time window;
  sending instructions to the first or second wireless communication devices to reset the first or second pairing time window; and
  modifying the visual indication to at least partially include a new pairing information for the first or second device.

11. The method of claim 4, further comprising:
  providing an ordered list of time remaining in the first and second pairing time windows, where the list has wireless communications devices similar time remaining in the first and second pairing time windows next to each other.

12. The method of claim 4, further comprising:
  removing the first or second wireless communication device from the graphical user interface in response to determining the first or second pairing time window has expired; or modifying a color of the first or second wireless communication device shown on the graphical user interface in response to determining the first or second pairing time window has expired.

13. The method of claim 4, further comprising:
  receiving third pairing information for a third wireless communication device,
    wherein the third pairing information includes time remaining in a third pairing time window for the third wireless communication device,
  wherein the first, second, and third wireless communication devices are hearing devices.

14. A non-transitory computer-readable medium storing instructions that when executed by a processor cause a hearing device to perform operations, the operations comprising: receiving first pairing information for a first wireless communication device,
    wherein the first pairing information includes time remaining in a first pairing time window for the first wireless communication device;
  receiving second pairing information for a second wireless communication device,
    wherein the second pairing information includes time remaining in a second pairing time window for the second wireless communication device; and
  providing a visual indication of the time remaining in the first and second pairing time windows via a graphical user interface.

15. The non-transitory computer readable medium of claim 14, the operations further comprising:
  receiving a selection of the first or second wireless communication device via the graphical user interface;
  modifying the visual indication in response to receiving the selection; and
  transmitting instructions to the first or second wireless communication device to play a sound associated with the selection.

16. The non-transitory computer readable medium of claim 14, the operations further comprising:
  receiving a push indication from the first or second wireless communication device;
  and modifying the visual indication in response to receiving the push indication.

17. A hearing system comprising a first hearing device and a second hearing device, each of the first and second hearing devices comprising:
  a microphone;
  a speaker;
  a processor coupled to the microphone and speaker;
  an antenna configured to transmit and receive wireless communication signals; and
  a memory coupled to the processor, the memory storing instructions that when executed by the processor cause the first and second hearing devices to:
    send time remaining in a first pairing time window for the first hearing device to a computing device, send time remaining in a second pairing; time window for the second hearing device to the computing device, and provide an indication of the time remaining in the first and second pairing time windows via a graphical user interface or the speaker, wherein the sending occurs until the pairing time window has expired.

18. The hearing device of claim 17, further comprising:

receiving an indication from the computing device to play a sound; and providing the sound in response to receiving the indication.

19. A computer-implemented method for providing pairing information, the method comprising:

displaying a first pairing information for a first wireless communication device, wherein the first pairing information includes a first pairing time window age for the first wireless communication device;

displaying a second pairing information for a second wireless communication device, wherein the second pairing information includes a second pairing time window age for the second wireless communication device;

displaying a visual indication of the time remaining in the first and second pairing time windows via a graphical user interface; and modifying the visual indication after the first or second pairing time window has expired.

20. The computer-implemented method of claim 19, further comprising:

receiving a push indication from the first or second wireless communication device;

and modifying the visual indication in response to receiving the push indication.

* * * * *

UNITED STATES PATENT AND TRADEMARK OFFICE
CERTIFICATE OF CORRECTION

| | | |
|---|---|---|
| PATENT NO. | : 11,297,451 B2 | Page 1 of 1 |
| APPLICATION NO. | : 16/647533 | |
| DATED | : April 5, 2022 | |
| INVENTOR(S) | : Ullrich Sigwanz et al. | |

It is certified that error appears in the above-identified patent and that said Letters Patent is hereby corrected as shown below:

On the Title Page

Please correct the Applicant under item (71), as follows:
Sonova AG, Stäfa (CH)

Signed and Sealed this
Fifteenth Day of November, 2022

Katherine Kelly Vidal
*Director of the United States Patent and Trademark Office*